L. DINESEN.
MILK PAIL.
APPLICATION FILED OCT. 16, 1915.
1,206,096.
Patented Nov. 28, 1916.
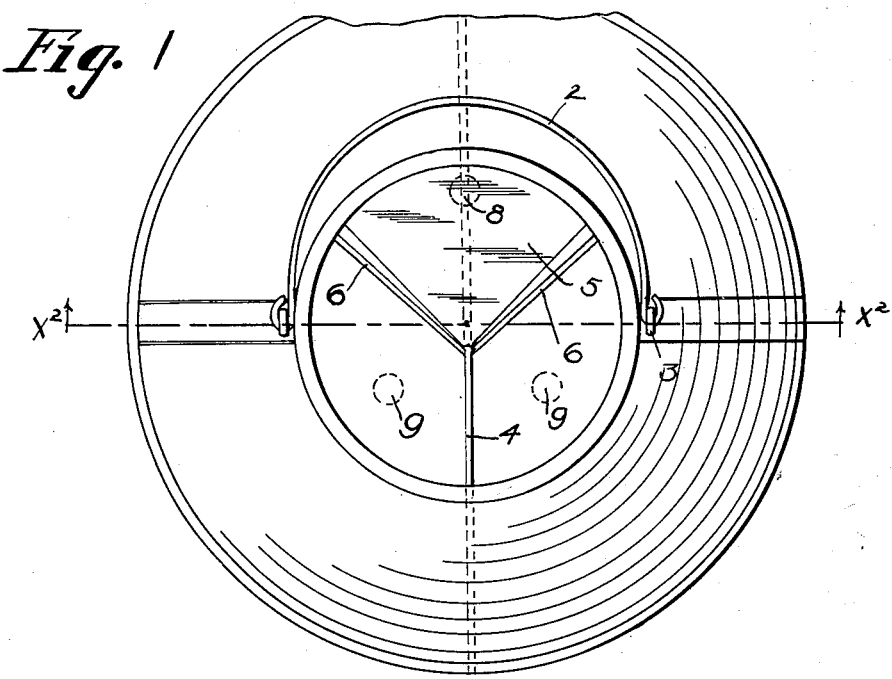
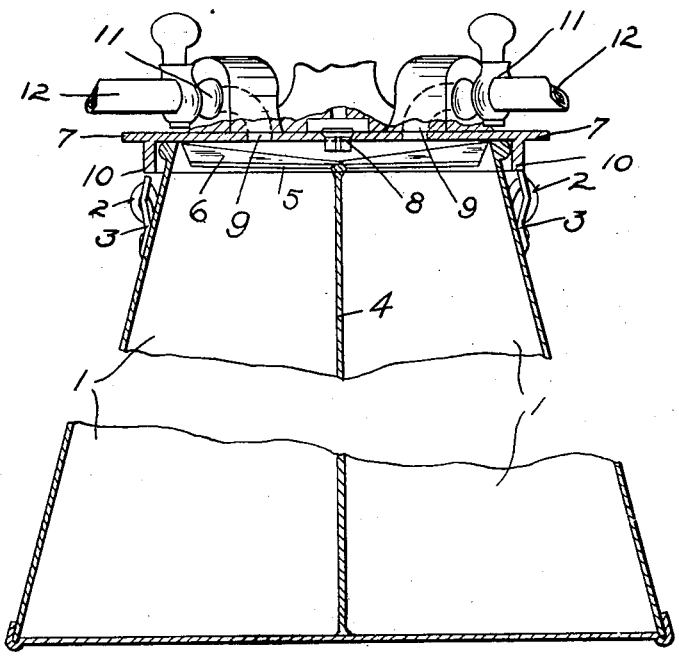
WITNESSES
G. F. Williamson
E. C. Skinkle
INVENTOR
LAURITS DINESEN
BY HIS ATTORNEYS
Williamson

UNITED STATES PATENT OFFICE.

LAURITS DINESEN, OF MINNEAPOLIS, MINNESOTA, ASSIGNOR TO PERFECTION MANUFACTURING COMPANY, OF MINNEAPOLIS, MINNESOTA, A CORPORATION OF MINNESOTA.

MILK-PAIL.

1,206,096.  Specification of Letters Patent.  Patented Nov. 28, 1916.

Application filed October 16, 1915. Serial No. 56,216.

*To all whom it may concern:*

Be it known that I, LAURITS DINESEN, a citizen of the United States, residing at Minneapolis, in the county of Hennepin and State of Minnesota, have invented certain new and useful Improvements in Milk-Pails; and I do hereby declare the following to be a full, clear, and exact description of the invention, such as will enable others skilled in the art to which it appertains to make and use the same.

My invention has for its object to provide an improved milk pail especially adapted for use in connection with milking machines designed for milking more than one cow at a time.

Dairymen working along scientific lines, necessarily have to keep a record of each cow's milk and, as most milking machines used by them are designed for milking two cows at the same time, into a single milk pail, special arrangements have to be made when samples of the milk are to be taken. My improved milk pail is designed to hold the milk from each cow in a separate compartment and from which compartments the milk is simultaneously poured in separate streams into individual receptacles provided for holding samples of the milk.

To the above end, generally stated, the invention consists of the novel devices and combinations of devices hereinafter described and defined in the claims.

In the accompanying drawings, which illustrate the invention, like characters indicate like parts throughout the several views.

Referring to the drawings, Figure 1 is a plan view of the improved milk pail, with the positions of certain elements of a milking machine, indicated with respect thereto, by means of broken lines; and Fig. 2 is a view of the improved milk pail in vertical section, taken on the line $x^2$ $x^2$ of Fig. 1, some parts being broken away, said view also showing, partly in side elevation and partly in section, a portion of a milking machine seated on the open top of the milk pail.

The improved milk pail 1 is, preferably, made from heavy galvanized sheet metal and is of conical form, which gives it a wide supporting base and a contracted open discharge neck. A carrying bail 2 is secured to the sides of the milk pail 1 by ears 3. The improved milk pail is divided into two compartments by an upright partition 4, and it is important to note that the upper edge of said partition is located slightly below the top of the milk pail 1.

To cause the milk to flow in a separate stream from each compartment of the milk pail 1, when the same is poured therefrom, there is provided a deflector 5, which extends on each side of the partition 4. This deflector 5 is segmental in form and rests horizontally on the upper edge of the partition 4, with its axis located in the plane of said partition and with its peripheral edge secured directly to the milk pail 1 below the upper edge thereof. The deflector 5 is preferably secured to the milk pail 1 and partition 4 by solder. The radial edges of the deflector 5 are bent upwardly and outwardly to afford flanges 6, which taper downward from the upper edge of the milk pail 1 to the axis of the deflector 5 and are soldered to said edge of the pail in oblique positions. The purpose for making the flanges 6, as described, is to prevent milk from collecting on the deflector 5 and for sanitary reasons.

From the above description, it is evident that in pouring milk from the improved milk pail, the milk in the two compartments will be separated by the deflector 5 into two streams. Individual receptacles, not shown, will be provided for receiving the samples of milk poured from the milk pail in separate streams.

The above described milk pail is especially adapted for use in connection with milking machines of the type shown in my two U. S. Patents, identified as follows:— 1,072,584, "milking apparatus", issued September 9, 1913, and 1,117,169, "pulsating device for milking apparatus", issued November 17, 1914.

The base portion of one of my improved milking machines is shown removably seated on the improved milk pail 1. Of the parts of this milking machine, it is important to note the disk-like base 7, having formed therein a valve-equipped port 8 and two discharge ports 9. The base 7 rests directly on top of the milk pail 1 and is provided with a depending annular flange 10, which closely surrounds the upper end of the milk pail and holds the milking machine in position thereon. The valve-equipped port 8 opens directly into the milk pail 1 over the deflector 5, as shown in Fig. 1, and is part of the system provided for producing a constant suction or partial vacuum in the milk pail 1. As the valve-equipped port 8 comes directly over the deflector 5, the locating of the deflector below the top of the milk pail 1 is necessary in order not to obstruct said port or to interfere with the action of its valve.

The two discharge ports 9 are located, one over each compartment of the milk pail 1, and each thereof has a valve-equipped nipple 11 to which is attached one end of a flexible tube 12. The other ends of these tubes 12 are attached, one to each of two groups of teat-cups, not shown. The constant suction in the milk pail 1 tends to draw the milk from the teats through the tubes 12, ports 9 and into the milk pail 1.

What I claim is:—

1. A liquid container having a partition dividing the same into two compartments, and a deflector extending on each side of said partition.

2. A liquid container having a discharge neck, a partition dividing the container into two compartments and extending into said discharge neck, and a deflector extending into said discharge neck from each side of the partition.

3. A liquid container having an annular discharge neck, a partition dividing the container into two compartments, and a segmental deflector extending on each side of the partition.

4. A liquid container having an annular discharge neck, a partition dividing the container into two compartments and extending into said discharge neck, and a segmental deflector extending into said discharge neck from each side of the partition and having its axis located in the plane thereof.

5. A liquid container having an annular discharge neck, a partition dividing the container into two compartments, and a deflector supported on said partition and extending on each side thereof, said deflector being located slightly below the outer edge of the discharge neck.

6. A liquid container having an annular discharge neck, a partition dividing the container into two compartments, and a segmental deflector supported on said partition and extending on each side thereof, said deflector being located slightly below the outer edge of said discharge neck and having its radial edges turned up to afford flanges, which taper downward toward the axis of said deflector.

7. A liquid container having a discharge neck, a partition dividing the container into two compartments, and a segmental deflector supported on the partition and extending on each side thereof, said deflector having on its radial edges upwardly projecting flanges.

8. A liquid container having upwardly tapered walls and an annular discharge neck, an upright partition dividing said container into two compartments, and a segmental deflector seated on said partition with its peripheral edge secured to said container and its axis located in the plane of the partition, said deflector extending on each side of the partition and having on its radial edges upturned flanges, which taper downward toward the axis of said deflector.

9. The combination with a milk pail having a partition dividing the same into two compartments, and a deflector extending on each side of the partition, of a milking apparatus seated on the milk pail and having two milk discharge ports arranged to discharge, one into each of the compartments of the milk pail.

10. The combination with a milk pail having a partition dividing the same into two compartments, and a deflector extending on each side of the partition, said deflector being located slightly below the upper edge of the milk pail, of a milking apparatus seated on the milk pail and having two milk discharge ports arranged to discharge, one into each of the compartments of the milk pail, said milking apparatus also having a depending valve-equipped suction port located over the deflector.

In testimony whereof I affix my signature in presence of two witnesses.

LAURITS DINESEN.

Witnesses:
 CLARA DEMAREST,
 HARRY D. KILGORE.